United States Patent [19]

Creton

[11] 4,325,186
[45] Apr. 20, 1982

[54] PROTECTION DEVICE ADAPTABLE FOR VERTICAL BLADE CUTTERS

[76] Inventor: Claude Creton, Résidence des Acacias Batiment E3, Avenue de Saige, 33600 Pessac, France

[21] Appl. No.: 143,296

[22] Filed: Apr. 24, 1980

[30] Foreign Application Priority Data

Apr. 26, 1979 [FR] France ................ 79 11214

[51] Int. Cl.³ ........................................ B26B 7/00
[52] U.S. Cl. .................................. 30/275; 83/544;
83/DIG. 1; 74/616; 200/61.85
[58] Field of Search ............. 30/273, 274, 275;
310/68, 50; 307/116, 117, 326, 324, 328;
361/179, 180; 340/407; 74/616; 192/131 R;
200/61.85, 61.86, 61.87, 61.88; 83/544, 545,
546, 478, DIG. 1

[56] References Cited

U.S. PATENT DOCUMENTS

| | | | |
|---|---|---|---|
| 1,283,895 | 11/1918 | Read | 30/275 |
| 2,862,297 | 12/1958 | Kaufmann | 30/275 |
| 3,026,503 | 3/1962 | Scheer | 180/272 |
| 3,848,502 | 11/1974 | O'Neill | 83/814 |
| 3,939,749 | 2/1976 | Muller | 83/814 |
| 3,946,288 | 3/1976 | Isaksson et al. | 180/272 |
| 4,024,633 | 5/1977 | Stucker | 30/273 |

FOREIGN PATENT DOCUMENTS

| | | |
|---|---|---|
| 343997 | 11/1921 | Fed. Rep. of Germany ... 200/DIG. 2 |
| 1443001 | 7/1976 | United Kingdom . |

*Primary Examiner*—James L. Jones, Jr.
*Attorney, Agent, or Firm*—Sandler & Greenblum

[57] ABSTRACT

Protection device adapted for use with a vertical blade cutter comprising a cutting blade. The device comprises a moveable plate for covering the blade and protecting against accidental contact with the blade. The moveable plate is adapted to be retracted during cutting and is further adapted to be otherwise lowered in front of the blade. A bar is provided which is adapted to slide in a guide adapted to be attached to the cutter. The moveable plate is mounted on the bar. A plate support is journaled onto the guide. A rotatable wheel is attached to the plate support. The rotatable wheel, when brought into contact with the bar while rotating, is adapted to raise the bar and moveable plate and whereas disengagement of the wheel from the bar causes the moveable plate to be lowered in front of the blade by virtue of its own weight and that of the plate.

11 Claims, 5 Drawing Figures

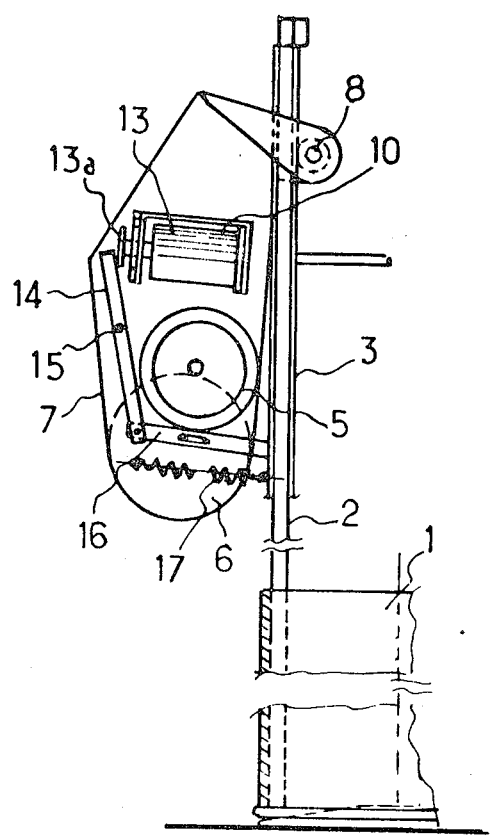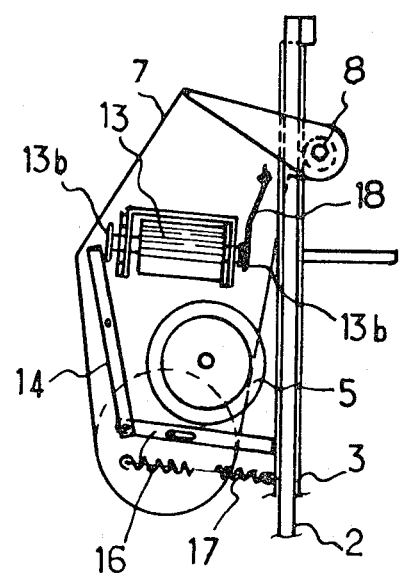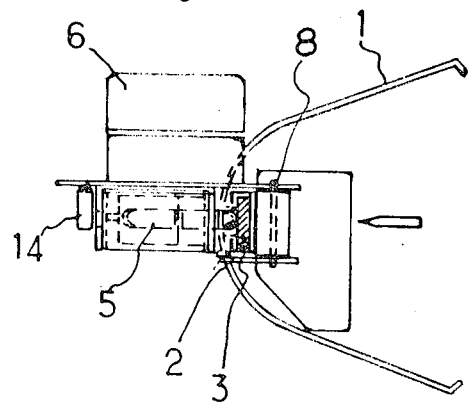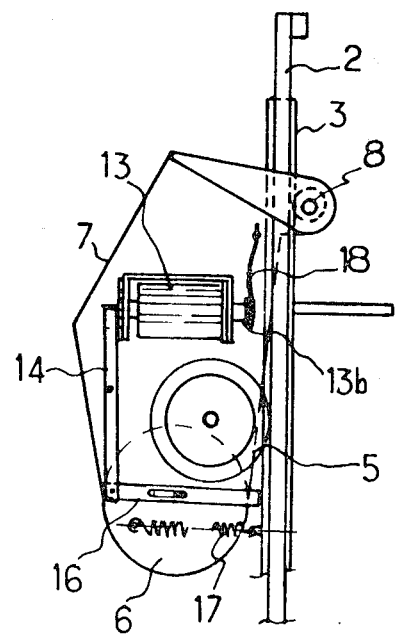

PROTECTION DEVICE ADAPTABLE FOR VERTICAL BLADE CUTTERS

BACKGROUND OF THE INVENTION

1. Field of the Invention

The present invention relates to a protection device adaptable for use with vertical blade cutters comprising a moveable covering and protection plate adapted to slide in a guide placed in front of the blade. The plate is adapted to retract from in front of the cutting blade by means of a driving device when the handle serving to direct the cutter is held. The plate automatically repositions itself when the handle is released and/or when the electric current is interrupted.

2. Description of Prior Art

The dangers associated with vertical blade cutters are known. To overcome these disadvantages cutters are provided with a moveable guard placed in front of the blades. These moveable guards are manually moved, which requires that the operator constantly think of lowering the guard when disengaging the machine, such as, for example to remove cut pieces. The type of manipulation results in a substantial loss of time and as a result, most often, the operator leaves the guard raised without even stopping the motor. On the other hand, when the protection guard is lowered, the blade is exposed since because of the cutter design, it protects the front face of the blade but not the sides. During various manipulations unrelated to the cutting, a very substantial danger may, therefore exist.

SUMMARY OF THE INVENTION

The invention has as an aim to minimize the various problems described above.

The invention therefore has as an object a protection device adapted for use with vertical blade cutters comprising a moveable blade covering and protection plate attached onto a sliding bar in a guide vertically positioned and held on the cutter in front of the blade. The bar support plate is moved by means of a driving device so as to cause the retraction of the covering plate upon the simple contact of the hand during the gripping of the handle serving to direct the cutter. The release of the handle or the interruption of the feed current causes the systematic lowering of the covering plate in front of the blade.

BRIEF DESCRIPTION OF THE DRAWINGS

Other characteristics and advantages of the invention will appear more clearly from the description which will follow done with reference to the drawings given by way of non-limiting example, in which:

FIG. 2 is a side view of the inventive device in the lowered position;

FIG. 3 is a top view of the device;

FIG. 4 is an alternative embodiment allowing for the reapplication of the protection device in the event the electric current is cut, voluntarily as well as involuntarily, the Figure illustrating the lowered protection device; and FIG. 5. illustrates the alternative embodiment of FIG. 4, with the protection device in the course of being raised and/or retracted.

As shown in FIGS. 1, 2, and 3, the protection device comprises a covering and protection plate 1 attached on a moveable bar 2 sliding in a guide 3 attached to the cutter 4. The displacement of the bar 2 in the guide 3 causing the retraction of the covering and protection plate is caused by a rubber wheel 5 biased against the bar 2. The wheel 5 is rotated by a motor-reducer 6 attached onto the support plate 7 journaled at 8 onto the guide 3. The activation of the motor-reducer 6 and as a result the retraction of the covering plate 1 occurs during the gripping of the handle 9 of the machine 4 which is used to direct the machine. This occurs through simple contact of human skin which activates the reel 10 provided with an electromagnet 13, coupled with the motor-reducer 6. The activation of the relay causes the motor-reducer to make contact and is caused when the two poles each constituted by a separate metallic wire, 11 and 12, embedded and wound helicoidally on the handle, are brought in contact by the simple contact of the human skin. The elevation and/or retraction of the covering plate 1 is stopped at the upper limit by means of a path ending not shown. When the handle is released and as a result connection between the two poles 11 and 12 is broken, the relay 10 is at rest and energizes the electromagnet 13 pushing armature 13a having the role of disengaging the rubber wheel 5 from the bar 2 by the simple action of a lever arm 14 journaled at 15 and shaft 16 supported on the guide 3. The shaft 6 is guided as shown in FIG. 2, causing the rotation of the support plate 7 thereby freeing the bar 2 which by virtue of its own weight and that of the covering plate 1, comes down to the lower dead point, a path end, not shown, serving to interrupt the voltage. The maintenance of the rubber wheel 5 against the bar 2 is caused by a return spring 17 connecting the support plate 7 to the guide 3.

Figure 1:
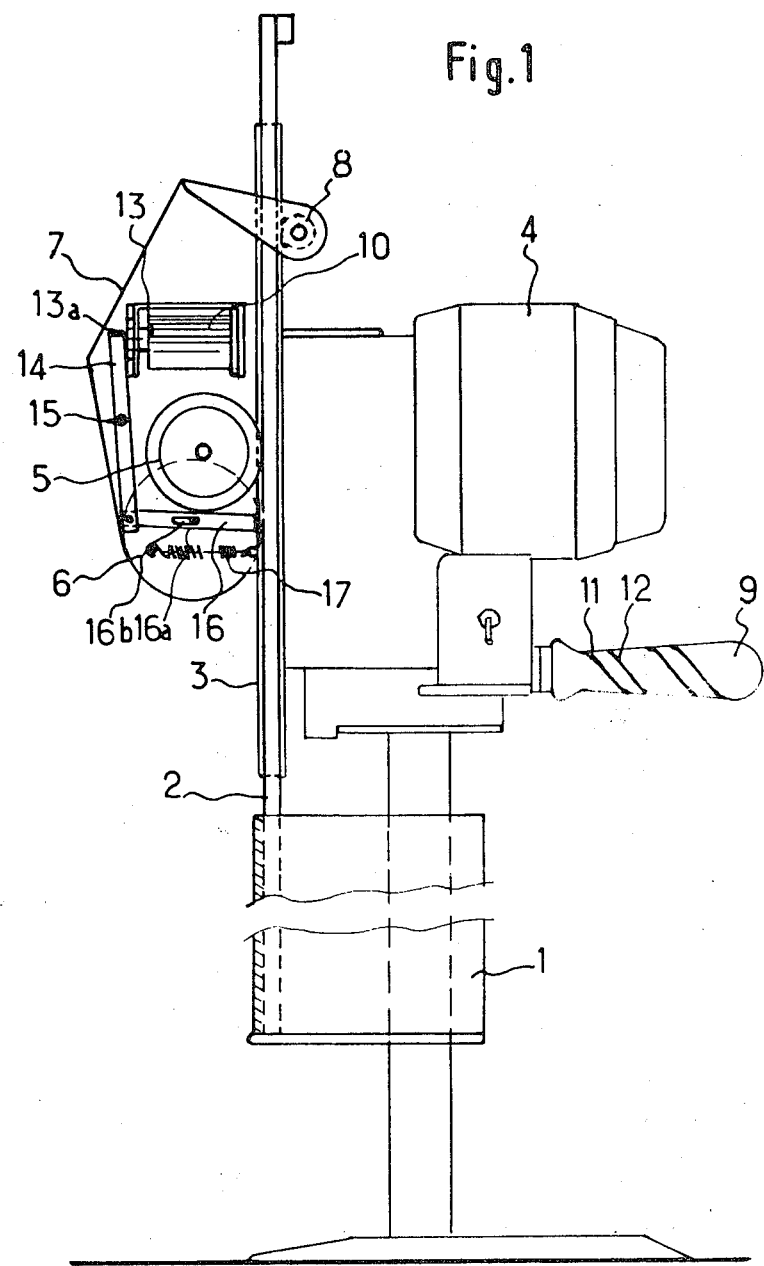
FIG. 1 illustrates a side view of the device with the covering plate retracted.

According to another embodiment shown in FIGS. 4 and 5, the cover plate is lowered both when one releases the handle 9 as well as when one voluntarily cuts the current or if the current is cut involuntarily. The device is modified with respect to the electromagnet armature 13. In effect the armature is positioned oppositely, i.e., that when the electromagnet is energized only when one grips the handle 9, the armature 13b compresses a spring blade 18 attached on the support plate 7 between the guide 3 and the electromagnet 13 which results in the freeing of the lever arm 14 and as a result causes the rubber wheel 5 to rest on the bar 2. When the handle 9 is freed or when the electric voltage allowing the machine to operate is interrupted voluntarily or involuntarily, the electromagnet 13 is no longer energized, and on the contrary, the armature 13b is biased by the spring blade 18 which causes the activation of the armature 13b on the lever arm 14 and as a result disengages the rubber wheel 5 from the bar 2 and from the coverplate 1.

The device forming the object of the invention can be utilized in every case where a vertically displaceable mobile protection is necessary for vertical blade cutters as well as for all other machines whose use is dangerous.

What is claimed is:

1. Protection device adapted for use with a vertical blade cutter comprising a cutting blade, said device comprising:

(a) a moveable plate for covering said blade and protecting against accidental contact with said blade, said moveable plate being adapted to be retracted during cutting and further being adapted to be otherwise lowered in front of said blade;

(b) a bar adapted to slide in a guide adapted to be attached to said cutter, said moveable plate being mounted on said bar;

(c) a plate support journaled on said guide; and (d) a rotatable wheel movably attached to said plate support, said rotatable wheel, when brought into contact with said bar while rotating, being adapted to raise said bar and moveable plate and whereas disengagement of said wheel from said bar causes said moveable plate to be lowered in front of said blade by virtue of its own weight and that of the plate.

2. The protection device as defined by claim 1 wherein said rotatable wheel is a rubber wheel, and said rubber wheel and said protection device further comprises a motor-reducer integral with said plate support for driving said rubber wheel.

3. The protection device as defined by claim 2 wherein said guide is vertical.

4. The protection device as defined by claim 2 wherein said cutting device comprises a handle for purposes of directing said blade cutter, and wherein said protection device further comprises a pair of wires acting as two poles connected to said motor-reducer adapted to be helicoidally wound on said handle, whereby contact of said pair of wires with human skin activates said motor-reducer to rotate said wheel to raise said bar thereby retracting said moveable plate from in front of said blade.

5. The protection device as defined by claim 1 further comprising a journaled lever arm, said lever arm being journaled onto said support plate, and a shaft, one end of said shaft resting against said guide and the other end of said shaft being journaled to said lever, and an electromagnet having an armature to push said journaled lever thereby forcing said shaft against said guide to pivot said support plate to disengage said wheel from said bar.

6. The protection device as defined by claim 5 wherein said vertical blade cutter comprises a handle for directing said cutting blade, and wherein said device comprises a pair of wires adapted to be wound on said handle, said pair of wires being connected to said electromagnet whereby the absence of contact of said wires with human skin energizes said electromagnet thereby pushing said journaled lever arm which in turn pushes said shaft to pivot said support plate and thereby to disengage said wheel from said bar, such that when said moveable plate is in the raised position, the bar and moveable plate are lowered by their own weight such that said moveable plate is in front of said blade.

7. The protection device as defined by claim 6 further comprising means for interrupting the energization of said electromagnet at the lower end of the path followed by said moveable plate.

8. The protection device as defined by claim 1, wherein said support plate is normally biased towards said bar by means of a spring attached between said guide and said support plate thereby pressing said wheel against said bar.

9. The protection device as defined by claim 1, wherein said support plate comprises an electromagnet with an armature therein and a spring blade acting on said armature, said armature being in contact with a journaled lever mounted on said support plate, and a shaft journaled to said journaled lever at one end thereof and resting against said bar at the other end thereof, said spring blade biasing said armature against said journaled lever when said electromagnet is not energized to space said support plate from said bar whereby the wheel mounted on said support plate is spaced from said bar.

10. The protection device as defined by claim 9 wherein said vertical cutting device comprises a handle for guiding said blade cutter, and wherein said protection device comprises a pair of wires adapted to be secured to said handle, said wires serving to energize said electromagnet when said handle is contacted by human skin, energization causing compression of said spring blade by means of said armature thereby freeing said lever arm such that said support plate pivots towards said bar and said wheel engages said bar.

11. The protection device as defined by claim 10 further comprising a spring connected between said support plate and said bar, said spring biasing said support plate towards said bar.

* * * * *

UNITED STATES PATENT AND TRADEMARK OFFICE
CERTIFICATE OF CORRECTION

PATENT NO. : 4,325,186

DATED : April 20, 1982

INVENTOR(S) : Claude CRETON

It is certified that error appears in the above-identified patent and that said Letters Patent is hereby corrected as shown below:

Column 1, line 23, "The" should be --This--.

Column 2, line 17, "in" should be --into--.

Signed and Sealed this

Twenty-seventh Day of July 1982

[SEAL]

Attest:

GERALD J. MOSSINGHOFF

Attesting Officer — Commissioner of Patents and Trademarks